United States Patent [19]

Langheim et al.

[11] 4,004,880

[45] Jan. 25, 1977

[54] METHOD AND APPARATUS FOR CUSHIONING CONTINUOUS EXOTHERMAL REACTIONS

[75] Inventors: Franz Langheim; Michael Braasch, both of Marl, Germany

[73] Assignee: Chemische Werke Huls Aktiengesellschaft, Marl, Germany

[22] Filed: May 29, 1975

[21] Appl. No.: 581,935

[30] Foreign Application Priority Data

June 14, 1974 Germany .................... 2428705

[52] U.S. Cl. .................... 23/230 A; 23/253 A; 23/285

[51] Int. Cl.² .................... B01J 3/02; B01J 4/00

[58] Field of Search ............ 23/285, 230 A, 253 A, 23/284; 62/54; 48/175; 260/78.5 R

[56] References Cited

UNITED STATES PATENTS 2,775,636  12/1956  Rupp ................ 23/285 X
3,078,265  2/1963  Berger ............... 23/285 X
3,652,229  3/1972  Burke ............... 23/285 X
3,794,471  2/1974  Latinen ............. 23/285

*Primary Examiner*—R.E. Serwin
*Attorney, Agent, or Firm*—Gilbert L. Wells

[57] ABSTRACT

Method and apparatus for cushioning continuous exothermal reactions with or in the presence of liquefied gases having a reactor, a condenser connected to the reactor, an accumulator connected to the condenser and a gravity fed cooling medium supply vessel providing cooling to the condenser. A first blocking valve which responds to excess pressure is inserted in the line between the reactor and the condenser and a second blocking valve, actuated synchronously with the first valve, activates the flow of the cooling medium through the condenser.

6 Claims, 3 Drawing Figures

METHOD AND APPARATUS FOR CUSHIONING CONTINUOUS EXOTHERMAL REACTIONS

CROSS REFERENCE TO A RELATED APPLICATION

Applicants claim priority under 35 U.S.C. 119 for Application Ser. No. P 24 287 05.6, filed June 14, 1974 in the Patent Office of the Federal Republic of Germany.

BACKGROUND OF THE INVENTION

The field of the invention is chemical apparatus having tanks, and the present invention particularly relates to a method and apparatus for cushioning continuous exothermal reactions with, or in the presence of liquefied gases.

The state of the art of the present invention may be ascertained by reference to U.S. Pat. Nos. 3,636,331; 3,749,555; 3,793,258 and 3,794,471, and German Published Patent Application No. 2,032,700 of Georg Schroeder et al, having a publication date of Jan. 13, 1972 the disclosures of which are incorporated herein.

U.S. Pat. No. 3,793,259 discloses the state of the art of continuous bulk polymerization of vinyl chloride while the remaining references disclose the state of the art of continuous polymerization reactors.

When carrying out exothermal reactions, for instance polymerization reactions, unevenness in the reaction sequence or failure of heat exchange may force a resort to gas expansion from the reaction chamber as the only way to prevent the reactor from bursting.

Until recently, such exothermal reactions were carried out on a large scale in reactors containing about 20 cubic meters. When the pressure in such reactors became excessive, or when heat generation grew too large, the gases were expanded into a gas vessel at normal pressure or into the atmosphere. The quantities of escaping gas in the prior art are relatively minor and generally harmless through dilution into the atmosphere.

Such expansion into the atmosphere is impossible as regards the recently developed large reactors holding up to 200 cubic meters, as disclosed in German Published Application No. 2,032,700 because of ecological and safety hazards. Furthermore, appreciable amounts of input materials are lost in this manner. High costs eliminate the feasibility of catching the gases escaping from a reactor into a sufficiently large gas vessel under normal pressure.

SUMMARY OF THE INVENTION

Having in mind the limitations of the prior art, the present invention has as an object means for containing continuous exothermal reactions with or in the presence of liquefied gases, without there being a loss of same and simultaneously observing ecological and safety regulations, and to do so in as simple a manner as possible.

This object is achieved in the present invention in that upon initiation of the reaction, the liquefied gases are expanded into a condenser, then they are condensed in same, and are collected in an accumulator.

Furthermore, in order to implement the method, the present invention makes use of apparatus comprising at least one gas exhaust line from the reactor with a blocking valve responding to over-pressure, a condenser so connected with a cooling medium supply vessel that the cooling means without application of external energy flows into the condenser through a blocking valve actuated simultaneously as that of the gas exhaust line, and an accumulator connected to the condenser.

When the pressure in a reactor holding liquefied gases rises excessively either because of unevenness in the reaction sequence or because of failure in the heat exchange, for instance if there is total power failure, or if the heat generated becomes excessive, then according to the present invention the liquefied gases are expanded through at least one gas exhaust line provided with a blocking valve responding to over-pressure. Because of the expansion evaporation, both pressure and temperature rapidly drop inside the reactor.

The gases escaping from the reactor are fed through a gas exhaust line into a condenser and are condensed therein. Conventional condensers of the state of the art, for instance boiler-tube nest heat exchangers are used as condensers.

Those liquids are used as cooling media which will boil in the cooling process, and also those which will not boil. To ensure that the method of the present invention may also be carried out if there is total power failure, the cooling means must be capable of flowing from the cooling medium supply vessel into the condenser without requiring external power, such as by gravity or by means of compressed gas.

Cooling liquids boiling during the cooling process allow the mounting of the cooling medium supply vessel and the condenser at the same height or elevation, provided the self-generated pressure or fluid head of the cooling medium is large enough to make the same flow also in such a case into the condenser without requiring external power.

The use of media boiling in the cooling process, such as ammonia, holds the advantage of the cooling medium supply vessel being kept smaller in size. However, an additional absorption system for the evaporated cooling medium is then required, to prevent the matter from entering the atmosphere.

For reasons of safety, the cooling medium supply in the supply vessel is large enough to condense the entire gas content of the reactor.

It is important in the method of the present invention that the blocking valves at the reactor and at the cooling medium supply vessel are opened synchronously and that the supply of cooling medium to the condenser is large enough to rapidly condense the gases escaping from the reactor. This is achieved through mechanical, electrical or pneumatic coupling of the blocking valves at the reactor and at the cooling medium supply vessel.

When the reaction in the reactor is computer controlled, as disclosed in U.S. Pat. No. 3,636,331, then opening and closing of the blocking valves at the reactor and at the cooling medium supply vessel are controlled by a computer. In this system of U.S. Pat. No. 3,636,331, one uses for instance "feed-forward" control, in which the blocking valves are controlled by a program developed from exhaustive process analysis. The blocking valves then are opened prior to reaching excessive pressure. Pressure, but also the temperature gradient in the reactor may be used as the control parameter. Such an embodiment is especially reliable in operation.

The condensate obtained in the condenser is collected in a pressure accumulator and may be used again. If the condensate tends toward polymerization, then to avoid this polymerization, minute amounts of a stopper solution are placed in the accumulator. It is especially advantageous to place the stopper solution in a "liquid bag" at the bottom of the accumulator, the condensate being made to pass by means of a dip-pipe through this liquid bag. This achieves especially good mixing.

BRIEF DESCRIPTION OF THE DRAWINGS

The present invention is better understood by reference to the attached drawings, wherein.

DESCRIPTION OF THE PREFERRED EMBODIMENTS

Figure 1:
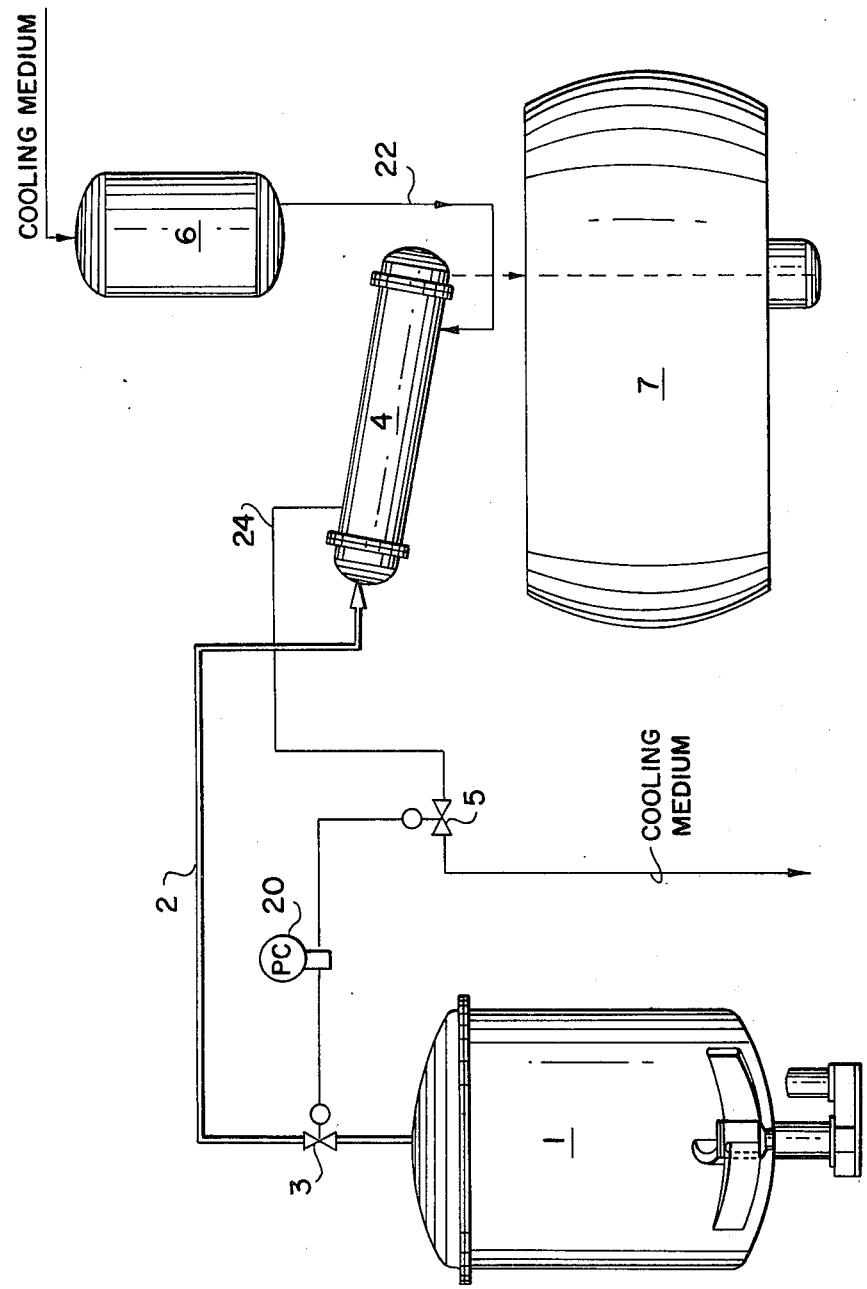
FIG. 1 is a diagrammatic plan view of the apparatus of the present invention having one blocking valve in the gas escape line synchronously controlled along with one blocking valve in the cooling medium line.

With particular reference to FIG. 1, when the pressure in reactor 1 rises excessively, the gas is expanded through a gas escape line 2 and a blocking valve 3 into condenser 4. Once blocking valve 3 is opened, blocking valve 5, located in line 24, is also opened synchronously, thus releasing the supply of cooling medium through line 22 from the cooling medium supply vessel 6. Valves 3 and 5 are actuated by pressure controller 20. In a particular embodiment of the pressure controller 20, similar to that in FIG. 5 of U.S. Pat. No. 3,794,471, the pressure controller receives an electric signal output from a pressure transducer in the vapor space of reactor 1 and opens valves 3 and 5 beyond a given excess pressure and then closes them when the pressure drops off. The opening of valves 3 and 5 can also be controlled by pneumatic means. The condensate obtained is collected in accumulator 7.

To prevent solid or foamed particles from being carried along with the gases escaping from the reactor, a separator is suitably mounted ahead of the condenser. A cyclone, for instance, or a suitably designed pressure vessel may be used as the separator.

When easily polymerized materials, with respect to the particular reaction conditions, are located in the reactor, the latter's blocking valve preferably should be rinsed with a suitable liquid to prevent clogging of the blocking valve.

Figure 2:
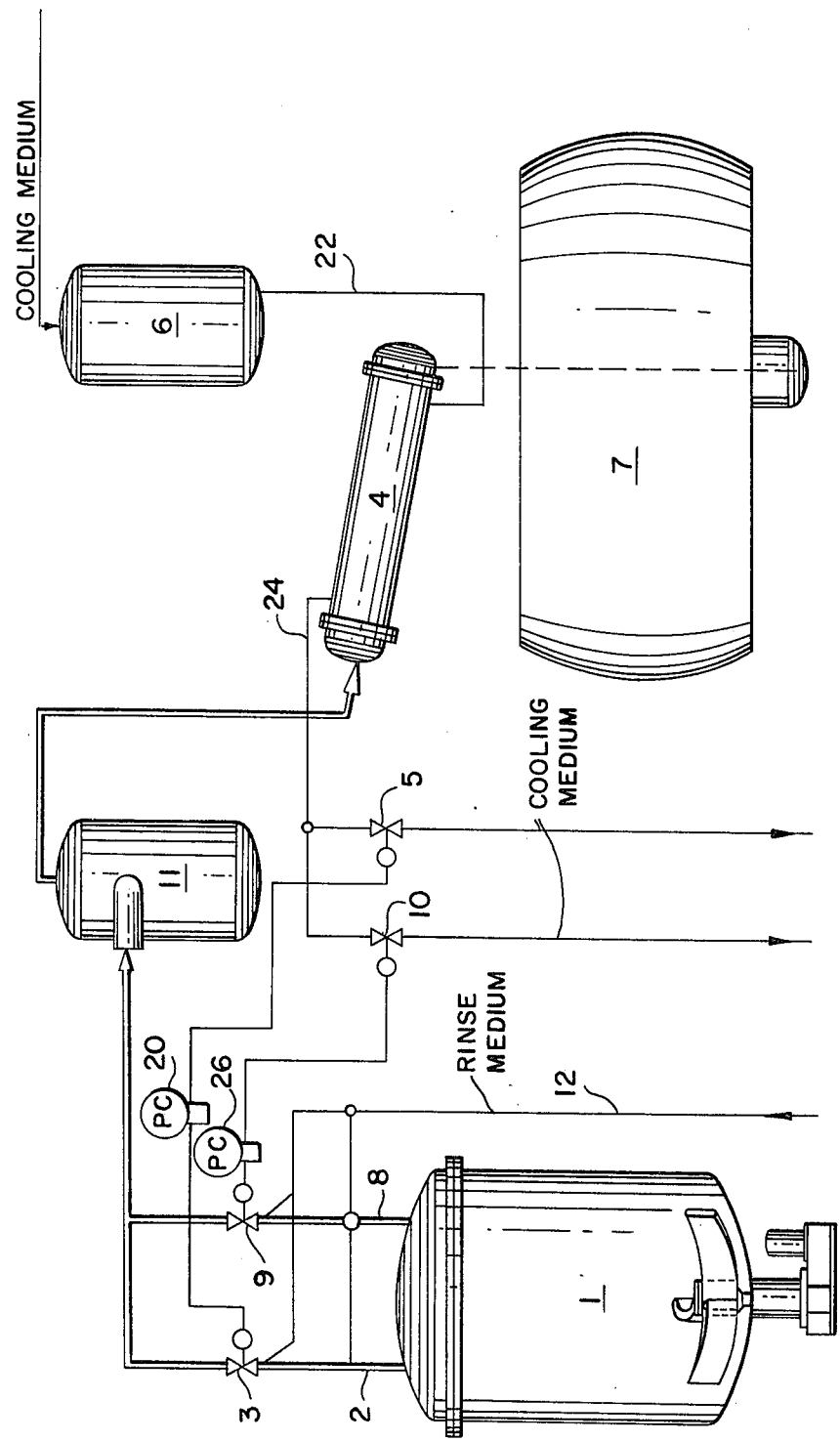
FIG. 2 is a diagrammatic plan view of the apparatus of the present invention having two blocking valves in the gas escape line and two blocking valves in the cooling medium line.

A preferred embodiment is shown in FIG. 2. Besides the elements shown in FIG. 1, there is a further gas exhaust line 8 provided with a blocking valve 9. Valve 9 is coupled to another blocking valve 10, which controls the supply of cooling medium from the cooling medium supply vessel 6. A separator 11 is mounted ahead of the condenser 4.

When the pressure in the reactor rises excessively, blocking valves 3 and 5 are opened first. If the pressure in the reactor fails to drop rapidly enough, a subsequent pressure controller 26 additionally opens blocking valves 9 and 10, and more expansion takes place. When materials are present in the reactor, which under the particular reaction conditions are easily polymerized, then rinsing blocking valves 3 and 9 with a suitable liquid through line 12 prevents clogging.

The method of the present invention may be applied to all exothermal reactions with or in the presence of liquefied gases, for instance in polymerization reactions of vinyl chloride, ethylene, propene, butene, butadiene or the like, as disclosed in U.S. Pat. Nos. 3,749,555 and 3,793,259.

The apparatus of the present invention comprising accumulator, condenser, cooling medium supply vessel and where desired separator, may be designed in very compact form. Parts of the apparatus of the present invention also may be used during the normal sequence of a reaction in order to recover the residual gases still in the reactor at the end of a reaction taking place therein.

Figure 3:
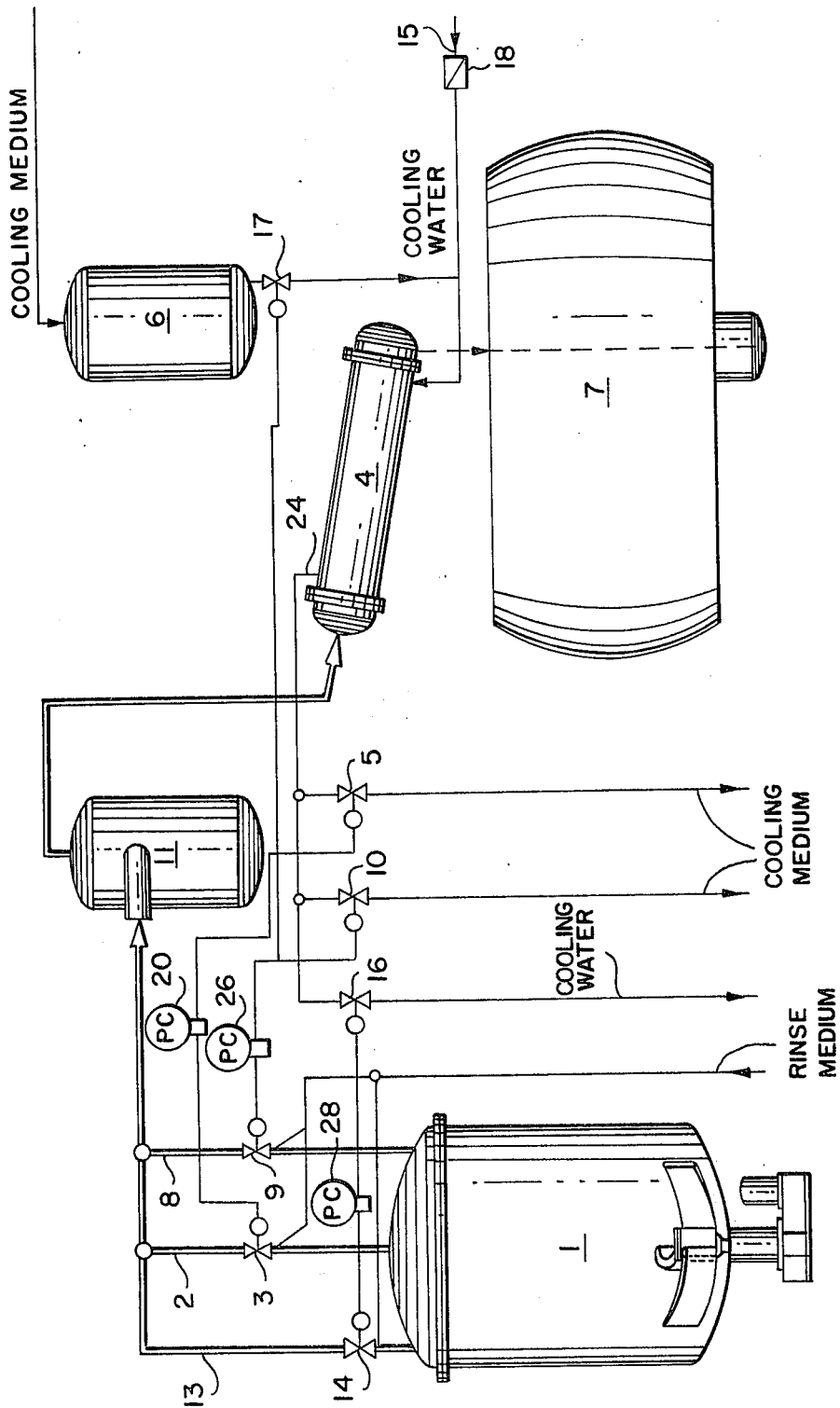
FIG. 3 is a diagrammatic plan view of the apparatus of the present invention having three blocking valves in the gas escape line and three blocking valves in the cooling medium line.

As shown in FIG. 3, the residual gas under pressure is expanded through an additional gas exhaust line 13 provided with a blocking valve 14 at the reactor and actuated by controller 28. In this case, the cooling medium is not supplied from the cooling medium supply vessel but rather through line 15. It can flow through blocking valve 16, which is coupled with blocking valve 14, into the condenser, the moment blocking valves 14 and 16 are opened. When the apparatus shown by FIGS. 1 and 2 is required, then blocking valves 3 and 5 or 9 and 10 are simultaneously opened with blocking valve 17.

A back pressure valve 18 prevents the cooling medium from flowing out of the cooling medium supply vessel into line 15 when, according to the present invention, the cooling medium flows from the cooling medium supply vessel into the condenser during a complete reaction in the reactor.

The method and apparatus of the present invention surprisingly protects in simple manner the reactor from bursting in the presence of complete exothermal reactions, without requiring discharging explosive or toxic gases into the atmosphere. The method of the present invention furthermore suffers no less of input materials. Also, high reliability and safety is achieved for large reactors, while simultaneously preventing damage or jeopardy of any kind to the environment.

EXAMPLE

FIG. 2 shows the apparatus of the present invention. The reactor holds 200 cubic meters and contains about 60 metric tons of vinyl chloride, 110 tons of water, activators and suspension means. The temperature in the reactor is about 60° C and the pressure is about 10 atmospheres. The capacity of the cooling medium supply vessel is about 200 cubic meters and it holds 200 cubic meters of cooling water at about 20° C. A nest of boiler tubes heat exchanger is used as condenser 4. Sliders with pneumatic control are used as the blocking valves at the reactor and at the cooling medium supply vessel. These valves are coupled through an electrical circuit. A direct digital control (DDC) system monitors whether the pressure in the reactor drops fast enough upon opening blocking valves 3 and 5. If not, the DDC system additionally opens blocking valves 9 and 10 and the control variable is pressure.

If through failure of heat exchange, the pressure in the reactor rises to about 14.5 atmospheres, the pneumatically driven blocking valves at the reactor and at the cooling medium supply vessel are opened by means of the electrical circuit. Thereupon within about 10 minutes, approximately 180 cubic meters of cooling liquid flows through the condenser. The pressure in the reactor is about 10 atmospheres within about 5 minutes, and the temperature drops to about 60° C. Approximately 30 metric tons of vinyl chloride are condensed in this step.

We claim:

1. A method for cushioning continuous exothermal reactions by the expansion of gases during an over-pressure condition during a power failure, comprising:
   a. conducting a continuous exothermal reaction in a reactor under elevated gas pressure in the presence of liquefied gases;
   b. at pressures beyond a given safe pressure, expanding said liquefied gases into a condenser to lower said elevated gas pressure below said given safe pressure;
   c. condensing said gases in said condenser;
   d. collecting the condensed gases in an accumulator;
   e. supplying cooling medium to said condenser at a pressure head sufficient to discharge the cooling medium through the condenser; and
   f. initiating said expanding and said supplying for cushioning said exothermal reaction during an over-pressure condition during a power failure.

2. An apparatus for cushioning continuous exothermal reactions by the expansion of gases during an over-pressure condition, comprising:
   a. a reactor having an elevated gas pressure therein generated by liquefied gases and said reactions;
   b. means for exhausting gas from said reactor beyond a given safe pressure;
   c. means for condensing connected to said means for exhausting and receiving the exhausted gas;
   d. means for accumulating connected to said means for condensing and receiving the condensed gas;
   e. a cooling medium supply vessel connected to said means for condensing and having a pressure head sufficient to discharge the cooling medium through said means for condensing; and
   f. means for initiating flow from said cooling medium supply vessel and means for activating said means for initiating flow synchronously with said means for exhausting gas.

3. The apparatus of claim 2, wherein said pressure head of the cooling medium is a gravity feed.

4. The apparatus of claim 3, wherein said means for exhausting gas is a first blocking valve responding to a first given excess pressure and said means for initiating flow is a second blocking valve actuated synchronously with said first blocking valve.

5. The apparatus of claim 3, wherein said means for exhausting gas are a first blocking valve responding to a first given excess pressure and a second blocking valve responding to a second given excess pressure greater than said first given excess pressure and said means for initiating flow are a third blocking valve actuated synchronously with said first blocking valve and a fourth blocking valve actuated synchronously with said second blocking valve.

6. The apparatus of claim 3, further comprising a commercial water supply source connected in line between said cooling medium supply vessel and said means for condensing and said means for exhausting gas are a first blocking valve responding to a first given excess pressure and a second blocking valve responding to a second given excess pressure greater than said first given excess pressure and said means for initiating flow are a third blocking valve actuated synchronously with said first blocking valve and initiating flow from said commercial water supply source and a fourth blocking valve actuated synchronously with said second blocking valve.

* * * * *